R. H. RICE.
FLOW METER OF THE VENTURI TYPE.
APPLICATION FILED NOV. 9, 1912.
1,126,275.
Patented Jan. 26, 1915.
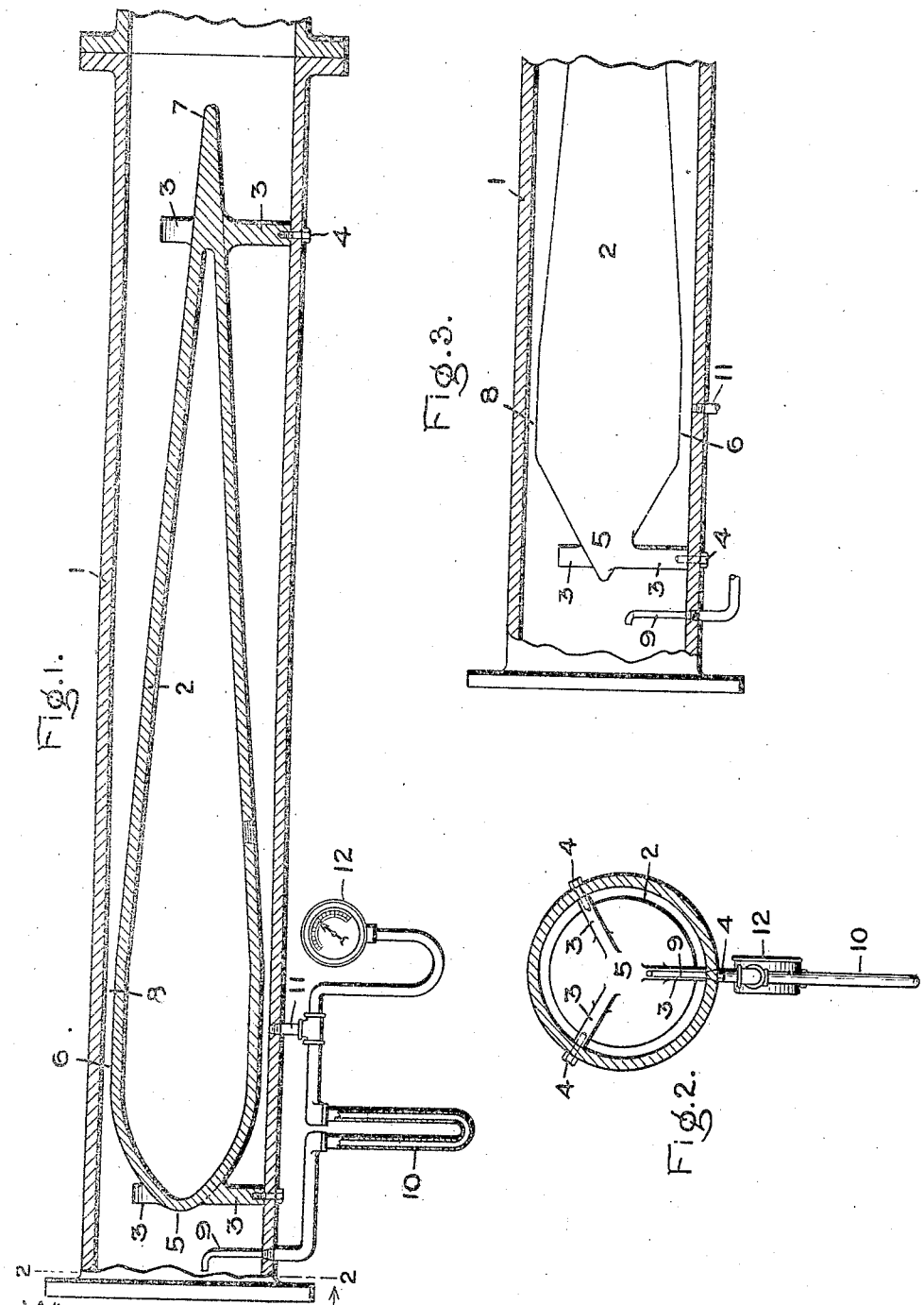
Witnesses:
Inventor,
Richard H. Rice,
by Albert G. Davis
Att'y.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

FLOW-METER OF THE VENTURI TYPE.

1,126,275.  Specification of Letters Patent.  Patented Jan. 26, 1915.

Application filed November 9, 1912. Serial No. 730,327.

*To all whom it may concern:*

Be it known that I, RICHARD H. RICE, a citizen of the United States, residing at Lynn, county of Essex, State of Massachusetts, have invented certain new and useful Improvements in Flow-Meters of the Venturi Type, of which the following is a specification.

This invention relates to instruments for indicating and recording the flow of fluids through conduits, and especially to that type in which the velocity head of the fluid is converted into a pressure head and caused to act upon a pressure-responsive device to display visible indications of the changes in said pressure due to varying flow of the fluid. Among the devices employed for converting velocity into pressure is the well-known Venturi tube, composed of two frusto conical gently tapering sections of conduit with their adjacent smaller ends connected by a short cylindrical section, or throat. The difference between the static pressures in the full sized conduit and the narrow throat is indicated by the difference in level between two upright mercury columns having their upper ends connected respectively to these two portions of the conduit, and communicating at their lower ends. The total length of the meter is from eight to sixteen times the largest diameter, while the diameter of the throat should be from one half to one fourth that of the conduit.

In practical engineering it is often difficult and expensive to install a Venturi meter, as several lengths of the conduit must be taken out and the special tapering sections put in.

The object of my invention is to provide a device which can be inserted in a length of ordinary cylindrical conduit, and convert it into a Venturi tube; the difference being that the fluid flows through said tube in an annular stream instead of a solid one. The effect, however, is absolutely the same in that the same difference in pressures is set up, which can be measured by the same manometer.

In the accompanying drawing, Figure 1 is a longitudinal section of a conduit for fluid containing my improved Venturi meter. Fig. 2 is a cross-section on the line 2—2, Fig. 1, and Fig. 3 is an elevation of a portion of the meter showing a slight modification of the filling member.

The section 1 of the conduit is of the same external diameter and appearance as the other sections thereof; in fact, it may be a length of the regular conduit pipe. Inside of this section is a filling member 2, preferably a hollow spindle, with its larger diameter near its upstream end. It is supported centrally in the pipe section 1 by means of radial stays 3 whose ends are secured to the pipe, preferably by screws 4. The filling member is provided with a somewhat blunt nose 5, which is preferably rounded as shown in Fig. 1; though it may be conical, as shown in Fig. 3, if desired. For a short distance back of the nose, the filling member has a preferably cylindrical portion 6, after which it tapers off gradually to a pointed tail 7. This shape is one which has been found by various experimenters to offer the least resistance to fluid flow.

The external diameter of the portion 6 is such as to leave a narrow annular passage or throat 8 between it and the internal surface of the pipe section 1. The radial width of this throat should be not over one-ninth of the internal radius of the conduit. This will give it an area of about one-fifth that of said conduit, which is sufficient to cause a material drop in pressure from that existing in the conduit proper.

A high pressure nozzle 9 is inserted in the conduit in advance of the nose of the filling member and is connected to one leg of the U-shaped manometer 10, the other leg of which is connected to the low pressure nozzle 11 entering the annular throat 8. A gage 12 may be provided to give the static pressure in said annular throat.

The advantages of this form of Venturi meter are, that it avoids the necessity of using a special section of pipe, as any ordinary straight section can be used, the filling member being preferably about the same length as such section, so that the radial stays can be easily accessible from the ends of said section for purposes of assembling or repair. Moreover the filling member and the pressure nozzles can be removed from the pipe if desired, and the conduit will then serve its ordinary purposes, without interference with the flow. The Venturi meter as customarily made has two or more joints uniting the several parts of its hour-glass shaped conduit. My invention entirely dispenses with these joints. Furthermore, it is not expensive to build, and can be quickly installed when desired.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a conduit of uniform diameter, of a filling member fastened therein comprising a smooth imperforate body which gradually increases in cross-sectional area from its ends to a point intermediate between the ends whereby it forms with said conduit a Venturi section.

2. A Venturi meter having a cylindrical conduit, and a spindle shaped filling member therefor having tapering ends and affording with said conduit an annular throat at its largest diameter.

3. A Venturi meter having a cylindrical conduit, and a spindle shaped filling member therefor having tapering ends, and having its largest diameter near one end of said member whereby it forms with said conduit a Venturi section.

4. A Venturi meter having a cylindrical conduit, and a filling member therefor having a rounded blunt nose, and a long tapering tail.

5. A Venturi meter having a cylindrical conduit, a spindle shaped filling member therefor having tapering ends, and radial stays securing said member centrally in said conduit.

6. A Venturi meter having a cylindrical conduit, and a spindle shaped filling member therefor having a cylindrical body portion and tapering ends, said cylindrical body portion forming with said conduit an annular throat.

7. A Venturi meter having a cylindrical conduit, a spindle shaped filling member therefor having tapering ends and affording with said conduit an annular throat, a pressure nozzle in advance of said member, a pressure nozzle entering said annular throat, and a pressure-responsive device connected with said nozzles.

8. The combination with a conduit composed of straight cylindrical sections, of a removable spindle shaped filling member for one of said sections, having tapering ends and affording with said conduit a narrow annular passage to function with the said section as a Venturi meter throat.

In witness whereof, I have hereunto set my hand this sixth day of November, 1912.

RICHARD H. RICE.

Witnesses:
JOHN A. McMANUS, Jr.,
FRANK G. HATTIE.